United States Patent [19]

Tashjian

[11] Patent Number: 4,768,136

[45] Date of Patent: Aug. 30, 1988

[54] AIRCRAFT LANDING ZONE MARKER

[76] Inventor: William Tashjian, 48 Church St., Westboro, Mass. 01581

[21] Appl. No.: 940,778

[22] Filed: Dec. 12, 1986

[51] Int. Cl.⁴ .............................................. T21K 2/00
[52] U.S. Cl. ........................................ 362/84; 362/34
[58] Field of Search .................. 362/34, 84, 95, 217, 362/418, 419, 426, 427, 401, 389, 140, 370, 371

[56] References Cited

U.S. PATENT DOCUMENTS

| 1,510,027 | 9/1924 | Anderson | 362/419 |
| 2,422,280 | 6/1947 | Abernathy | 362/427 |
| 3,463,915 | 8/1969 | Day | 362/34 |
| 3,875,602 | 4/1975 | Miron | 362/34 |
| 3,884,560 | 5/1975 | Neylon et al. | 362/34 |
| 3,900,728 | 8/1975 | Holcombe | 362/34 |
| 3,934,539 | 1/1976 | Little et al. | 362/34 |
| 3,967,274 | 6/1976 | Howell | 362/84 |
| 4,104,708 | 8/1978 | Bohli | 362/34 |
| 4,186,426 | 1/1980 | Grigras, Sr. et al. | 362/34 |
| 4,281,370 | 7/1981 | Masenheimer et al. | 362/419 |
| 4,379,320 | 4/1983 | Mohan et al. | 362/89 |
| 4,494,177 | 1/1985 | Matthews | 362/418 |

Primary Examiner—Samuel Scott
Assistant Examiner—H. A. Odar
Attorney, Agent, or Firm—Blodgett & Blodgett

[57] ABSTRACT

A portable landing zone marker which includes a fixture for holding a chemiluminiscent element to provide an illuminated night landing zone for aircraft. The marker also includes a relatively heavy and dense base which enables the marker to resist relatively high winds.

13 Claims, 2 Drawing Sheets 4,768,136

AIRCRAFT LANDING ZONE MARKER

BACKGROUND OF THE INVENTION

The present invention generally relates to a portable aircraft landing zone marker and, more particularly, to a helicopter night landing zone marker which is adapted to hold a chemiluminescent light element.

Helicopters have played an important role in emergency air transport programs, particularly in the delivery of emergency medical services. Most particularly, the helicopter has been used to an increasing degree in association with hospital trauma centers.

The chief advantage of helicopter use in emergency medical transport is time. The shorter the time it takes to get care to the patient, the more successful emergency medical treatment is likely to be. Another advantage of helicopter use is its greater access to locations which cannot be reached by land vehicles.

When a particular emergency medical situation presents itself, and where helicopter transport will be utilized, preparations must be taken by ground personnel before arrival of the helicopter. A safe landing zone must be made available to the helicopter. This involves providing an open area, free of light objects which are capable of being blown away "sandblasted" by wind created by the helicopter rotor. "Sandblasting" has caused injuries to ground personnel as a result of relatively light objects being swept upward and away from the helicopter during landing.

Circumstances are more complex during a helicopter night landing. The pilot, even with the aid of the helicopter's spotlight, has difficulty in guaging when landing "touchdown" will be made. This problem exists because the pilot has no known ground reference source to determine the altitude of the helicopter immediately before "touchdown". A second problem is that ground personnel are unable to fully clear light objects from the landing zone without adequate lighting.

Ground personnel have generally employed motor vehicles, so that the vehicles headlights would illuminate a night landing zone. Positioning the vehicles as such, however, makes them unavailable for other uses during the emergency situation. While, headlight illumination helps the pilot to see the landing site, the pilot still has difficulty in judging touchdown of the helicopter.

Road hazard flares have also been used to mark night landing zones. However, the flares create a risk of combustion of such materials as spilt gasoline and dry fieldgrass. This is an additional and unnecessary peril. Even where there is no risk of combustion the road flares are often sandblasted and thereby create a risk to attendent personnel.

Use of chemiluminescent flares has remedied the risk of combustion. And stakes have been utilized to secure these flares to the ground to prevent the effect of sandblasting. Where extra care has not been taken to secure the stakes, the occurance of sandblasting has remained. Additionally, some landing zone surface conditions prevent the use of stakes, either where the surface conditons are loosely granular or paved roadways. These and other difficulties experienced in the past have been obviated by the present invention.

It is, therefore a primary object of the present invention to provide a portable weighted landing zone marker which includes a light emitting element for providing a night landing zone under low light conditions.

A further object of the invention is to provide a portable aircraft night landing zone marker capable of being stored in emergency land vehicles.

It is a further object of the invention to provide a weighted night landing zone marker which is resistent to the effect of high winds.

It is another object of the invention to provide a weighted landing zone marker for helicopter night landings which is resistent to being sandblasted.

With these and other objects in view, as will be apparent to those skilled in the art, the invention resides in the combination of elements and conditions set forth in the specification and covered by the claims appended hereto.

SUMMARY OF THE INVENTION

In general, the invention consists of a portable landing zone marker which includes a light emitting element to provide an illuminated night landing zone for aircraft. The landing zone marker includes a weighted base which is sufficiently heavy and dense to be resistent to natural wind and wind created by a landing aircraft. The landing zone marker has particular application in marking an emergency landing zone for helicopters.

DESCRIPTION OF THE PREFERRED EMBODIMENT

Figure 1:
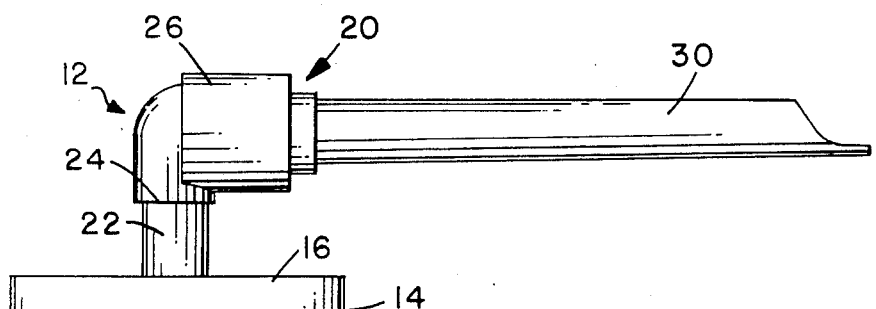
FIG. 1 is a side elevational view of a landing zone marker embodying the principles of the present invention.
Figure 2:
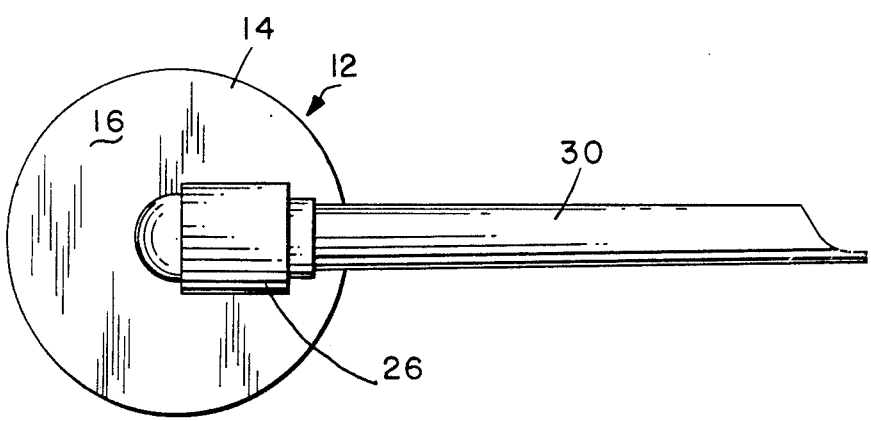
FIG. 2 is a top plan view of the marker.

Referring to FIGS. 1-5 of the drawings the preferred aircraft landing zone marker of the present invention is generally indicated by the reference numeral 12. The landing zone marker 12 includes a weighted base 14 having a top surface 16 and a bottom surface 18. A holding fixture, generally indicated by reference numeral 20, is fixed to the top surface 16, and extends upwardly therefrom. The holding fixture 20 comprises a vertical support arm 22 having an upper end 24 and a head portion 26. The head portion 26 is fixed to the upper end 24 and includes a socket 28, see FIG. 5, for receiving a chemiluminescent lightstick 30.

Figure 8:
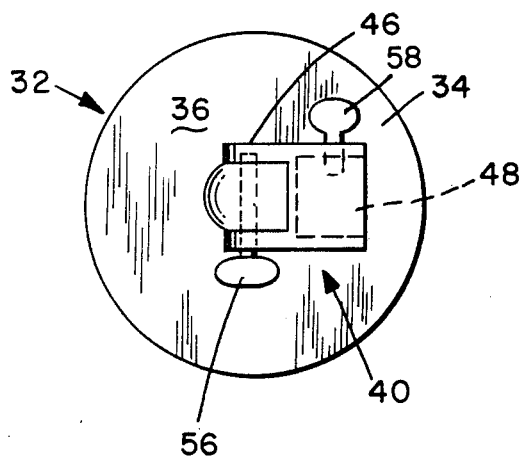
FIG. 8 is a plan view of the modified marker of FIG. 7.

The socket 28 of the preferred embodiment is provided with internal threads 29 for engaging the lightstick 30. The head 26 is made of a material which is substantially harder than at least the portion of the nightstick 30 which is inserted into the socket 28 so that the internal threads 29 are relatively harder than the portion of the lightstick 30 which is inserted into the socket 28. The lightstick 30 is inserted into the socket 28 with a twisting motion so that as the stick 30 progressively engages the internal threads 29, the stick 30 is self threaded. Alternatively, the head portion 46 may be provided with an exteriorly mounted thumbscrew 50 having one end which projects into the socket 28 as shown in FIG. 8. After the lightstick 30 is inserted into the socket 48 the thumbscrew is tightened to engage that portion of the lightstick 30 which is inserted into the socket 48.

The weighted base 14 is sufficiently heavy and dense to resist natural wind and artificial wind which is created by landing aircraft. The weighted base 14 is also resistent to the effect of sandblasting, as caused by a helicopter's rotor at landing and takeoff. The weighted base 14 is made of relatively heavy metal including ferrous metals, lead, or copper alloys. Stainless steel is used in the preferred embodiment as the composition of the base 14.

Figure 3:
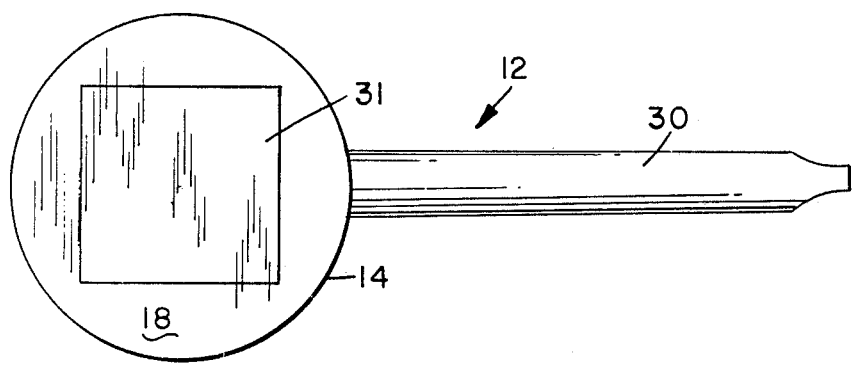
FIG. 3 is bottom plan view of the marker.
Figure 4:
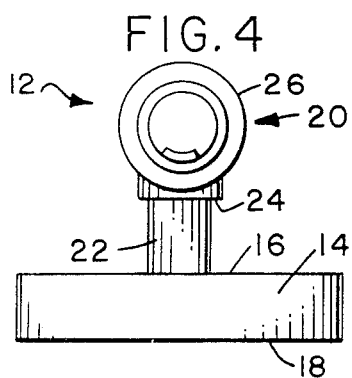
FIG. 4 is a front elevational view of the marker.
Figure 5:
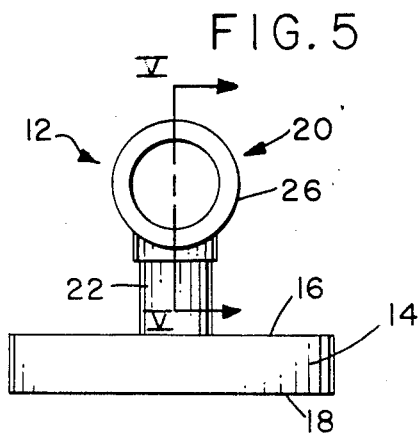
FIG. 5 is a front elevational view of the marker without the light emitting element.

Referring to FIG. 3 the bottom surface 18 of the landing zone marker 12 is substantially flat and provided with an embedded magnet 31. The magnet 31 permits the landing zone marker 12 to be removably affixed to a ferrous surface.

The lightstick 30, as shown in FIG. 1, in the the preferred embodiment is manufactured by American Cyanamid Company, and is sold under the tradename "CYALUME". The lightstick 30 contains chemiluminescent compounds which on activation provides a high intensity light emitting reaction. The activated lightstick 30 is visible to aircraft pilots for approximately two miles and provides a suitable ground reference point.

Figure 6:
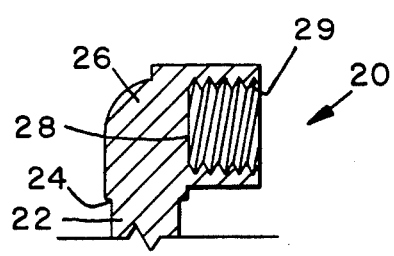
FIG. 6 is a vertical cross-sectional view of the marker, taken on line V—V of FIG. 5 and looking in the direction of the arrows.
Figure 7:
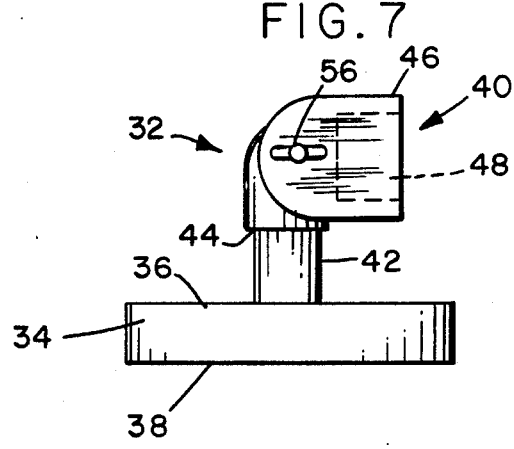
FIG. 7, is a side elevational view of the holder portion of amodified marker.

An alternative form of the present invention is shown in FIGS. 6 and 7. The modified landing zone marker is generally indicated by the reference numeral 32 and includes a weighted base 34 which has a top surface 36 and a bottom surface 38. The base 34 is identical to the base 12 of the preferred embodiment. A holding fixture, generally indicated by the reference numeral 40 is fixed to the top surface 36 and extends upwardly therefrom. The holding fixture 40 comprises a vertical support arm 42 having an upper end 44 and a head portion 46 which is pivotly connected to the upper end of the support arm. The head portion 46 is bifurcated so that it straddles the upper end 44 as shown in FIG. 7. A thumbscrew 56 extends freely through one of the bifurcations of the head portion and the upper end 44 and is threaded into the opposite bifurcation of the head portion. This enables the head portion 46 to be clamped into a fixed position relative to the vertical support arm by tightening the thumbscrew 56. By loosening the thumbscrew 56, the head portion 46 can be moved to any angular position relative to the support arm and thereafter fixed in a new position.

The modified landing zone marker 32 is particularly useful for uneven or inclined terrain. When the modified landing zone marker is positioned on an inclined surface, the thumbscrew 56 is loosened to change the degree of angulation of the lightstick relative to the base 34. This enables the head portion 46 to be adjusted so that the lightstick assumes a horizontal orientation to provide optimum visibility to the pilot of a landing aircraft.

The head portion 46 includes a socket 48 which has internal threads for receiving the chemiluminescent lightstick 30 of the preferred embodiment (not shown). As in the preferred embodiment the head portion 46 is made of a material which is relevantly harder than the material of the lightstick 30 to enable the lightstick 30 to be self-threaded when it is inserted into the socket 48.

It is obvious that minor changes may be made in the form and construction of the invention without departing from the material spirit thereof. It is not, however, desired to confine the invention to the exact form herein shown and described, but it is desired to include all such forms as properly come within the scope claimed.

The invention having been thus described, what is claimed as new and desired to secure by Letters of Patent is:

1. A landing zone marker for aircraft landings under law light conditions, said landing zone marker comprising:
   (a) a compact supporting base which has a top surface and a bottom surface for resting on a supporting surface of a landing zone, said base being sufficiently heavy and dense relative to the marker as a whole to resist natural wind and artificial wind which is created by landing aircraft for maintaining the landing zone marker in a set position in (or) the landing zone,
   (b) a holding fixture which is fixed to and extends upwardly from said top surface, said fixture having a socket, and
   (c) a lightstick having chemiluminescent properties and which is adapted to be removably inserted into said socket.

2. A landing zone marker as recited in claim 1, wherein said bottom surface is substantially flat and includes an attached magnet for affixing said landing zone marker to a ferrous surface.

3. A landing zone marker as recited in claim 1, wherein said base is made of ferrous metal.

4. A landing zone marker as recited in claim 1, wherein said base is made of lead.

5. A landing zone marker as recited in claim 1, wherein said base is made of copper alloy.

6. A landing zone marker as recited in claim 1, wherein said fixture comprises:
   (a) a vertical support arm extending upwardly from the top surface and having an upper end, and
   (b) a head portion mounted to the upper end of said support arm and containing said socket.

7. A landing zone marker as recited in claim 6, wherein said socket has a central longitudinal axis which is at an angle relative to said vertical support arm.

8. A landing zone marker as recited in claim 7, wherein said head portion includes an externally mounted thumbscrew, said thumbscrew having one end which projects into said socket, for engaging the portion of said lightstick which is inserted into said socket.

9. A landing zone marker as recited in claim 7, wherein said upper end includes a hinge joint for adjusting the degree of angulation of said mounted head portion relative to said vertical support arm.

10. A landing zone marker as recited in claim 9, wherein said hinge joint includes a thumbscrew to lock said head portion at a desired angle.

11. A landing zone marker as recited in claim 1, wherein said lightsticks are of the type which are sold under the tradename "CYALUME".

12. A landing zone marker as recited in claim 1, wherein said lightstick is frictionally held within said socket.

13. A landing zone marker as recited in claim 12, wherein said socket has internal threads which are relatively harder than the portion of said lightstick which is inserted into said socket, whereby said portion is self threaded when it is inserted into said socket.

* * * * *